US005181702A

United States Patent [19]

Pettigrew

[11] Patent Number: 5,181,702

[45] Date of Patent: Jan. 26, 1993

[54] WORKPIECE HOLDDOWN DEVICE

[76] Inventor: Dennis K. Pettigrew, 7725 CR,32, Butler, Ind. 46721

[21] Appl. No.: 818,639

[22] Filed: Jan. 6, 1992

[51] Int. Cl.[5] .......... B23Q 3/02

[52] U.S. Cl. .......... 269/93; 269/95; 269/166

[58] Field of Search .......... 269/91-95, 269/99, 166

[56] References Cited

U.S. PATENT DOCUMENTS

| | | | |
|---|---|---|---|
| 680,680 | 8/1901 | Armstrong et al. | 248/231.7 |
| 936,767 | 10/1909 | Van Eyck | 99/369 |
| 1,785,746 | 12/1930 | Pilling | 248/154 |
| 2,148,307 | 2/1939 | Scott | 311/103 |
| 2,160,433 | 5/1939 | Griffin, Jr. et al. | 248/147 |
| 2,731,858 | 1/1956 | Evans | 77/62 |
| 2,891,753 | 6/1959 | Bittle | 248/149 |
| 2,920,855 | 1/1960 | Giebel | 248/226 |
| 2,986,184 | 5/1961 | Curtis | 269/166 |
| 3,045,727 | 7/1962 | Clarke | 144/92 |
| 3,262,666 | 7/1966 | Solum | 248/226 |
| 3,575,373 | 4/1971 | Reinhardt | 248/361 |
| 4,143,869 | 3/1979 | Paterson et al. | 269/166 |
| 4,191,366 | 3/1980 | Rabin | 269/900 |
| 4,505,624 | 3/1985 | Kelly, Jr. | 408/109 |
| 4,513,955 | 4/1985 | Daubon | 269/43 |
| 4,750,537 | 6/1988 | Green | 144/363 |
| 4,861,011 | 8/1989 | Varga | 269/99 |
| 4,867,427 | 9/1989 | Cunningham | 269/166 |
| 4,928,917 | 5/1990 | Wolf | 248/507 |

OTHER PUBLICATIONS

Dec. 1991 Issue of the Trend Lines Catalogue from Chelsea, Mass. showing the Circled Holddown Device on p. 38.

*Primary Examiner*—Bruce M. Kisliuk
*Assistant Examiner*—Eileen Morgan
*Attorney, Agent, or Firm*—Baker & Daniels

[57] ABSTRACT

A workpiece holddown apparatus is shown that includes a post, removably securable to a variety of work tables and benches by a bolt extending through a hole or slot in the work table or bench and received in a threaded bore in one end of the post. An arm assembly consisting of a tubular sleeve is radially disposed on the post for 360° rotational and axial sliding movement thereon, and includes an arm radially extending from and attached to the tubular sleeve at an upward angle taken from a perpendicular of the axis of the post, the arm terminating with an internally threaded bushing in which is threaded a screw having an axis parallel to the post. The screw includes a handle portion and foot portion, the foot portion adapted to contact and press against a workpiece as the screw is tightened. In addition to the clamping force exerted on the workpiece by the screw, the threaded bushing holding the screw, and consequently the attached arm, is moved upwardly as tightening occurs, which creates a moment about the sleeve on the post. The sleeve, having a slight clearance between its inner surface and the post, is axially offset by the upward movement of the arm thus providing a binding action on the post. The workpiece is thus securely held between the work table or bench and the foot portion, in a variety of variable positions.

12 Claims, 2 Drawing Sheets

WORKPIECE HOLDDOWN DEVICE

BACKGROUND OF THE INVENTION

1. Field of the Invention

The present invention relates to devices for holding objects or workpiece and, more particularly, to a holddown device having 360° swivable maneuverability for moveable attachment to various tools and tables.

2. Description of the Prior Art

During cutting, drilling, and performing other machine tool operations upon a workpiece, it is vital that the workpiece being acted upon is securely held in place, whether the workpiece is on a drill press, a mill table, a welding table, a workbench, or otherwise. Should the workpiece move or slip while the operator is performing an operation on the workpiece, the unsteady workpiece can spin, break, splinter, or be propelled away from the work table Various devices have heretofore been devised for retaining variously-shaped workpieces on work surfaces during machining operations, including parallel clamps, C-clamps, angle plates, jackscrews, step blocks, V-blocks, flat straps, U-straps, gooseneck straps, and specialty clamps designed to work with particular tools. These devices, however, are tolerably effective in holding the workpiece since in most instances two or more of them must be cooperatively utilized in order to securely retain the workpiece. It is cumbersome and time-consuming to set up the workpiece holding apparatus for possibly only one operation thereby adding to the labor cost and the possibility of problems due to the interaction of the various pieces.

One prior art clamping device is shown in a tool catalogue from Woodcraft of P.O. Box 1686, Parkersburg, W. Va., and consists of a notched shank or post that rests in a table-mounted collar having matched ridges within the collar to prevent slipping of the post. A non-moveable transversely-extending arm is formed at the top of the post distal the table surface, the arm having on its extended end, a pivoting second arm. The second arm has a pivoting foot portion for holding against the workpiece and an internally threaded bushing on the other end accommodating a threaded screw that angles against and tightens on the distal end of the post throwing the post off the perpendicular so it binds to the collar Several problems associated with this type of prior art clamping device are its manner of adjustability, its ease of adjustability, and its adjustability with respect to the workpiece. First, the height of the post is adjustable only in discrete steps defined by the notches in the post and the associated rings in the collar. Second, if the height of the post is adjusted, the second arm must pivot about its axis either upwards or downwards changing the location on the workpiece that the foot contacts. In order to remedy this, the location or orientation of the workpiece must be changed in order for the foot to contact the same location Third, the second arm has only a limited range of motion defined by the pivot and the practical length of the threaded screw in being able to contact the post.

Another prior art clamping device is shown in U.S. Pat. No. 3,575,373—Reinhardt et al. entitled "Holddown Device." There, a flat arm extends essentially perpendicular to and is movable on a central post. Extending from the distal end of the arm, relative to the post, is a spring-biased holding pad for contacting the surface of the piece to be held down The arm is canted on the post by the pressure of the biasing spring This prior art clamping device is disadvantageous in that it cannot clamp down on a workpiece with enough force to prevent the workpiece from moving, especially when the workpiece needs to be drilled, milled, or otherwise, and is particularly designed to be used in conjunction with a plurality of the same devices for holding gas meters, or the like, during transportation.

In addition, holddown devices of the prior art are limited in their range of movement due to their mounting location or physical constraints such that orientation of the workpiece is confined to the range of movement of the holddown device. Further, most devices of the prior art cannot accommodate workpieces having vastly different thicknesses. Also, with prior art devices that purportedly allow vertical and/or horizontal clamping, either the devices cannot accommodate both or they are not reliable enough to securely hold the workpiece Further, transportability and adaptability of the prior art holddown devices to various machines and tables is extremely limited and in most instances the prior art devices are confined to the location in which they are originally installed.

It is thus an object of the present invention to overcome the shortcomings of the prior art and provide a simple, yet effective workpiece holddown that is also extremely versatile and readily transplantable.

SUMMARY OF THE INVENTION

The present invention provides a workpiece holddown device that securely holds a workpiece under a screw mechanism by a double binding action of the screw mechanism and an arm assembly and post mechanism, and is adapted to be removably mountable on any work surface. A sleeve surrounding the post and slidable thereon, is disposed at one end of the arm assembly, and includes a minute clearance between the post and the inner surface of the sleeve for frictional binding during clamping and axial slidability on the post in an infinite number of positions. Upward force exerted at one end of the arm assembly by the screw mechanism during clamping of the workpiece creates a moment about the arm assembly which frictionally binds the sleeve to the post as the arm assembly is upwardly angle as a result of the exerted force.

In a preferred embodiment, the present invention provides an easily transplantable workpiece holddown device including a post secured to a work table or bench, an arm assembly rotatably and axially displaceable at one end upon the post, and a screw portion disposed on the other end of the arm assembly for tightening down upon a workpiece. The arm assembly includes an arm with a sleeve on one end for movement on the post, and a threaded bushing on the other end for receiving the screw mechanism.

A workpiece holddown device for retaining a workpiece onto a work surface, the holddown device comprising a post including mounting means for removably securing the post to the work surface, an arm assembly extending from the post perpendicular to an axis of said post, the arm assembly being rotatable and axially slidable about the post, and screw means disposed on the arm assembly distal the post for clampingly holding the workpiece against the work surface, the screw means creating a moment about the arm assembly to bind the arm assembly to the post when the screw means is tightened on the workpiece.

In one form, the arm assembly includes a cylindrical sleeve surrounding the post, an arm attached at one end to the cylindrical sleeve and extending therefrom at an angle, preferably not more than 45° from a line perpendicular to the axis of the post, and an internally threaded cylindrical bushing attached to the other end of the arm that threadedly receives a screw assembly having a handle at one end and a foot at the other end that holds the workpiece against the work surface, the screw assembly turns within the bushing independently of the axial and radial movement of the arm assembly on the post.

Binding of the workpiece against the work surface is accomplished by the downward force of the screw assembly clamping against the workpiece and work surface. In addition, the bushing and sleeve are respectively bound against the screw portion and post by a shifting of their axes relative to the screw portion and post in opposite directions resulting from the force of the screw portion clamping against the workpiece.

It is an advantage of the present invention that it can accommodate workpieces of various extreme dimensions by having an axially slidable arm on a post providing infinite variations of clamping positions.

Another advantage of the present invention is that it is easily transplantable to a variety of tools and tool environments.

It is yet another advantage of the present invention that it can accommodate and is easily adaptable to a wide range of shapes and sizes of workpieces to be clampingly held, and requires very little effort in setting up.

It is further an advantage of the present invention that it is easily adaptable to be utilized in horizontal and vertical orientations.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
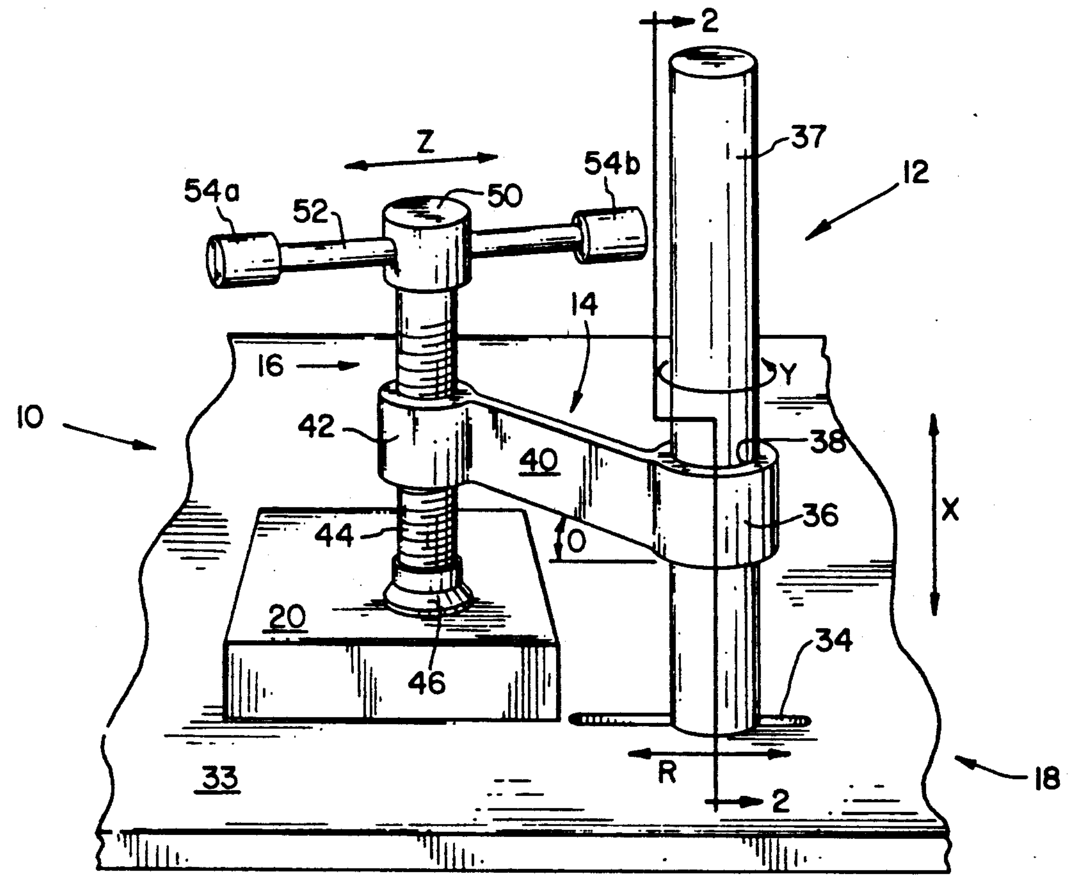
FIG. 1 is a front elevational view of a preferred embodiment of the workpiece holddown device.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Referring to FIG. 1, there is shown a preferred embodiment of a workpiece holddown device 10. Workpiece holddown device 10 includes a post 12, an arm assembly 14, and a screw assembly 16 secured or fastened to a work table 18, such as a drill press, mill table, work bench, or the like. In the preferred embodiment, the entire workpiece holddown device is fabricated from steel to provide a heavy and solid tool that can withstand repeated torque and pressure loads. Although steel is preferred due to its strength and relative low cost, other materials can be utilized in fabricating the workpiece holddown device, e.g. other metals, alloys of metals, and composites, that offer the same or superior material strength and torque load requirements.

Figure 2:
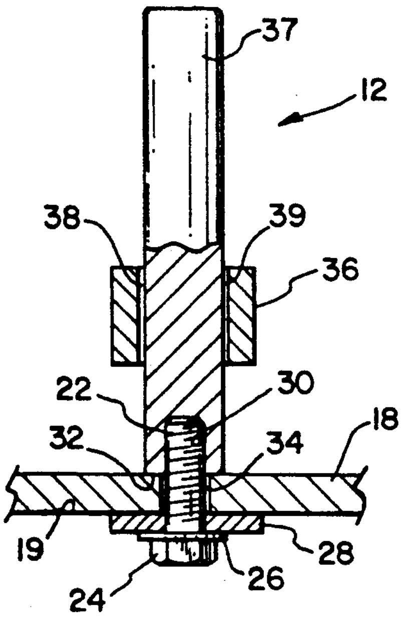
FIG. 2. is a view taken along line 2-2 of FIG. 1.

Referring to FIG. 2, there is shown post 12 as it is secured to table 18. In an exemplary embodiment, post 12 was constructed having an overall length of 6 inches, and an outer diameter of 1.06 inches, although the length of post 12 is quite variable depending on the desired location and use of the holddown device, while the outer diameter of post 12 is variable only to the extent that post 12 can be securely seated upon table 18 without movement off the vertical axis and still accommodate a bolt of sufficient size to handle the torque and stress. Table 18 includes a slot 34 through which a conventional bolt 22 having a conventional bolt head 24 extends from the underside 19 of table 18. Between bolt head 24 and table 18 is a washer 26 and a rectangular plate 28 both of which serve to vertically stabilize bolt 22 and post 12, and distribute the clamping force from bolt head 24 against the underside 19 of table 18. Post 12 has on one end a tapped or threaded bore 30 that threadedly receives bolt 22 such that post 12 screws down upon bolt 22, or alternatively bolt 22 screws into bore 30, with sufficient clamping force until end 32 of post 12 contacts the top 33 of table 18. Thus, post 12 is firmly secured to, but easily removable from, table 18.

Referring again to FIG. 1, post 12 is preferably mounted in a slot like those found on drill press tables in order for the holddown assembly 10 to accommodate a wider range of movement as assembly 10 is moved along a path indicated by arrow R. Although a slot is preferable, a slot of sufficient diameter to accommodate the bolt could also be used. Thus, a workpiece 20 may be held at different positions along its length by adjusting either workpiece 20 or, alternatively, easily adjusting the holddown post position. Radially disposed on and surrounding post 12 is a sleeve 36 having a longitudinal length of 1.25 inches, although any suitable length can be utilized. Sleeve 36 is freely slidable on post 12 in an axial direction indicated by arrow X and is also freely rotatable 360° about post 12 in a direction indicated by arrow Y. Sleeve 36 has a clearance 39 (see FIG. 2) from the outer surface 37 of post 12 to the inside surface 38 of sleeve 36 of approximately 0.002 inches. Although the clearance between outer surface 37 and inside surface 38 can be greater or smaller than 0.002 inches, it has been found that 0.002 inches is an optimal value. If there is less clearance, sleeve 36 will not be able to be easily moved either axially or circumferentially and be frictionally bound thereon. If there is more clearance, sleeve 36 will not frictionally bind to post 12, thus requiring more pressure to be exerted against sleeve 36 to bind sleeve 36 against post 12. Consequently, if there is too much clearance between outer surface 37 and inner surface 38 there would be no binding regardless of the force exerted by screw assembly 16.

Attached to sleeve 36 by welding or other suitable means, is a radially extending arm 40 having a height of 1 inch or an approximate height corresponding to the axial length of sleeve 36, and an approximate thickness of ½ inch although all dimensions are contemplated as modifiable. Arm 40 is preferably 3-5 inches in length depending on the desired application, although a 7 inch arm could be used for all applications, but greater or smaller lengths may be utilized depending on the workpiece being held or the application. Also, the longer the arm, the greater the pressure exerted upon post 12 during clamping of a workpiece. Arm 40 is attached to sleeve 36 at an angle, designated O, that is shown in FIG. 1 as measured from a line perpendicular to the centermost axis of sleeve 36. In FIG. 1, angle 0 is approximately 20°. Although the degree of arm angle is not critical, arm 40 should be attached to sleeve 36 such that there is at least a nominal upward arm angle 0 as taken from a line perpendicular to the centermost axis of sleeve 36. Preferably, angle O would be less than 45° from the perpendicular. An arm could be attached to the sleeve at an exact perpendicular to the post axis but this would limit its overall maneuverability.

Attached to the other end of arm 40, by welding or otherwise, is an internally threaded bushing 42 drilled and tapped for ¾–10, although other sizes and thread spacing can be utilized. Bushing 42 is attached to arm 40 in an orientation such that its axis is parallel to the axis of sleeve 36. Bushing 42 is of approximately the same axial length as sleeve 36 but has a smaller inner and outer diameter, however the diameters of bushing 42 are variable. Threadedly received in bushing 42 is a screw portion 44 having on one end a foot 46 which contacts the workpiece at a location 48 between foot 46 and table top 33. Screw portion 44 is approximately 4.63 inches long with a ¾ inch diameter having ¾–10 threads, although these dimensions are modifiable. On the other end of screw portion 44 is a cap 50 formed integral with screw portion 44 through which is received a cylindrical handle 52 movable in a transverse direction Z, relative to screw portion 44 and cap 50. Handle 52 terminates on either end with cylindrical end pieces **54*a* and 54*b* formed integral with handle 52 allowing the operator to easily turn screw portion 44. Screw portion 44 thus turns within bushing 42 as handle 52 is turned. Turning handle 52 in a particular direction turns screw portion 44** in a likewise direction.

Screw assembly 16 exerts an upward force upon arm assembly 14 when screw assembly 16 is tightened upon workpiece 20 by a screw action of threaded bushing 42 as foot 46 contacts workpiece 20 and is securing or holding workpiece 20. Threaded bushing 42 will continue to move on the screw portion 44 as screw assembly 16 is tightened. When an upward force is exerted by screw assembly 16 on one end of arm assembly 14, a moment exists about arm assembly 14 that causes sleeve 36 to axially tilt or shift about post 12, the amount of shifting being determined by clearance 39. Thus, sleeve 36 is frictionally bound or locked upon post 12 by the moment created by the upward force of the clamping action so that arm assembly 14 locks itself at any desired position.

Figure 3:
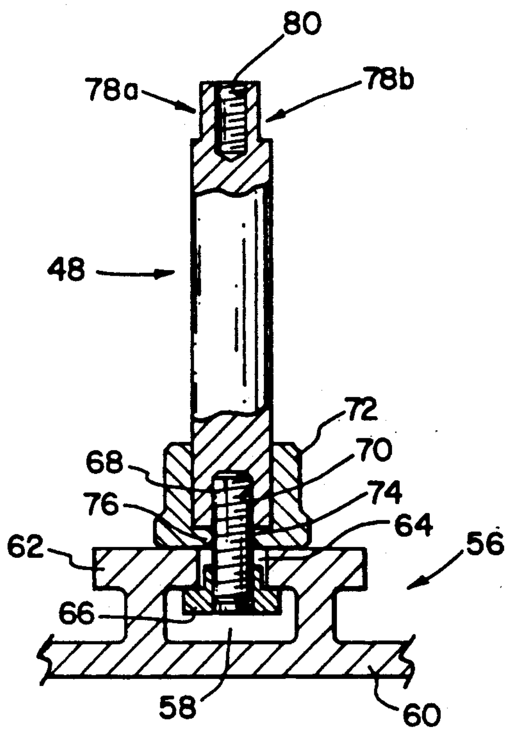
FIG. 3 is a partial sectional view of an alternative embodiment of the post of the present invention, and its manner of mounting.

The securing of post 12 would normally be as shown in FIG. 2, as table 18 could be any supporting surface such as a plate, a workbench, or otherwise. There are, however, additional mounting surfaces which may not be configured so as to be able to secure post 12 in the conventional manner. Referring now to FIG. 3, there is shown an alternative embodiment regarding the mounting or securing of post 48. FIG. 3 shows a sectional view of a typical mill table 56 in which there is typically an elongated channel 58 having a rectangular cross-section defined between a lower table portion 60 and an upper table portion 62. Upper table portion 62 has an elongated bore 64 that longitudinally communicates with channel 58. Disposed in channel 58 is a conventional T-nut 66 having a bolt 68 threaded therethrough. T-nuts with bolts are typically used to secure parts to devices that have channels, such as mill tables, and are generally of a standard size. Bolt 68 is generally a large bolt, larger than bolt 22 of FIG. 2, and is received in a threaded bore 70 in one end of post 48. Because bolt 68 is a large diameter bolt, it is preferable to include a ring-like collar 72 radially surrounding post 48 for extra vertical support and stability of post 48 since there would be less end post material to contact the table surface in this embodiment. Collar 72 includes a bore 74 through which bolt 68 extends to be threadedly received into threaded bore 70 of post 48. Post 48 is shown resting on a bottom surface 76 of collar 72 which contributes to the stability of post 48.

On the other end of post 48, still referring to FIG. 3, are two diametrically opposed notches or flats **78*a* and 78*b* forming radially inward steps. Notches 78*a*, 78*b* are to be utilized by a suitable wrench in order to tighten post 48 onto bolt 68 since it is not possible to tighten bolt 68 by the T-nut being disposed in channel 58. Alternatively, any type of configuration can be utilized in place of notches 78*a* and 78*b* that can accommodate a tool for tightening post 48** onto the table surface.

Post 48, as shown in FIG. 3, also includes threaded bore 80 in the non-attached end of post 48 which would be used to secure post 48 to a device utilizing the simple mounting structure as shown in FIG. 2 with the smaller diameter bolt. Threaded bore 80 is optionally included in post 48 as shown in the embodiment of FIG. 3, but for greater versatility, bore 80 is included so that one may mount post 48 on more surfaces and tools.

Figure 4:
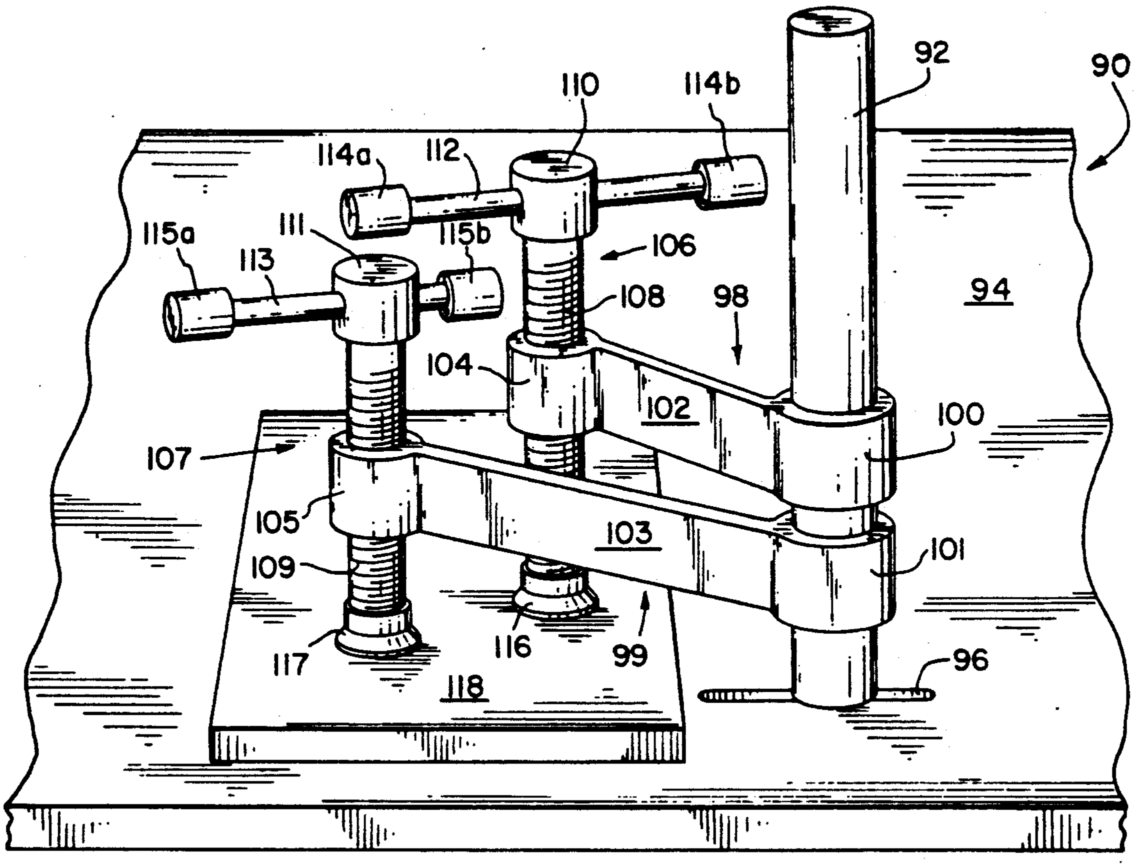
FIG. 4 is a front elevation view of an alternate embodiment of the workpiece holddown.

Referring now to FIG. 4, there is shown an alternative embodiment of the workpiece holddown assembly designated 90. Post 92 is secured to the work surface or table 94 through slot 96 in the same ways as shown in FIGS. 2 and 3, and described herein. However, instead of having only one arm assembly about post 92, there are attached two arm assemblies 98 and 99 both having a sleeve 100 and 101, an arm 102 and 103, and a threaded bushing 104 and 105. Each arm assembly is as described hereinabove although arms 102 and 103 may be of different lengths rather than having the same length in order to provide more user flexibility. Likewise, each threaded bushing 104 and 105 have a screw assembly 106 and 107 each having a screw portion 108 and 109, an end cap 110 and 111, a handle 112 and 113 terminating in cylindrical end pieces **114*a*, 114*b* and 115*a*, 115*b*, and feet 116 and 117 that contact workpiece 118**.

Thus, it is possible to locate two (2) or more arm assemblies on the same post, where the arms can be the same or different lengths depending on the particular application or workpiece orientation. Thus, it is contemplated that one post can accommodate a plurality of arms up to a workable maximum.

In operation, and referring to FIG. 1, workpiece holddown device 10 functions as hereinbelow described. Workpiece 20 is situated upon the work surface, table, or otherwise while arm assembly 14 is rotated so that foot 46 of screw assembly 16 is over the location on workpiece 20 that is to be clamped. Adjustment of screw assembly 16 such that foot 46 is over workpiece 20 is accomplished by sliding arm assembly 14 on post 12 and/or turning screw portion 16. Alternatively, if post 12 is mounted in a slot (e.g. slot 34) post 12 may be moved, however, this is generally not necessary due to the great range of movement already afforded by the present invention. Arm assembly 14 is thus rotated and slidably raised or lowered while screw portion 16 is turned to adjust workpiece holddown 10 such that foot 46 is over clamping position 48. Once arm assembly 14 is correctly positioned over clamping position 48, screw portion 16 is tightened down upon the workpiece. The tightening of screw portion 16 provides very secure clamping of the workpiece between foot 46 and table surface 33. This tightening also creates an upward force causing threaded bushing 42 to upwardly rise on screw portion 44 thereby creating a moment about sleeve 36. This moment causes sleeve 36 to be axially offset in a clockwise direction relative to the axis of post 12, thus binding itself upon post 12. This upward tension of screw assembly 16 further causes bushing 42 to be axially offset in a counterclockwise direction relative to the axis of screw portion 44 thereby binding itself upon screw portion 44, preventing screw portion 44, and screw assembly 16, from counterrotating and loosening the binding or clamping force being exerted upon the workpiece. Thus, there is a double binding action of the arm assembly 14 preventing arm assembly 14 from radially or axially shifting during clamping in addition to the screw portion 44 securing the workpiece upon the table.

The procedure is similarly performed when there are multiple arm assemblies upon one post, as shown in FIG. 4, or there are multiple workpiece holddown devices being employed.

The dimensions and materials of workpiece holddown 10 are not absolute, and deviations from them are contemplated and expected. The dimensions herein specified were utilized in the exemplary construction of the present workpiece holddown device, and do not necessarily represent absolute construction preference.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A workpiece holddown device for retaining a workpiece onto a work surface having an opening therein, the holddown device comprising:

- a cylindrical post having a longitudinal axis and removably mounted to the work surface adjacently over said opening;
- mounting means for securing said cylindrical post to said work surface;
- an arm assembly having on one end thereof a sleeve radially surrounding said cylindrical post and on another end thereof screw means, said sleeve being continuously rotatable about said cylindrical post through 360° and axially slidable on said cylindrical post, said arm assembly extending radially outwardly from said cylindrical post;
- said screw means disposed on said arm assembly distal said cylindrical post for clampingly holding the workpiece against the work surface, said screw means creating a moment about said arm assembly to bind said arm assembly to said cylindrical post when said screw means is tightened on the workpiece, wherein said sleeve is tilted relative to said cylindrical post when said screw means is tightened against the workpiece thereby creating a friction bind between said sleeve and said cylindrical post such that said sleeve will not axially slide on or rotate about said cylindrical post.

2. The workpiece holddown device of claim 1, wherein said bolt includes a T-nut, and said mounting means further comprises a collar radially surrounding said post at the work surface and having a bore therein through which said bolt extends.

3. The workpiece holddown device of claim 1, wherein said screw means includes a threaded bushing and a screw portion threadedly received in said threaded bushing, said threaded bushing being axially offset when said screw means is tightened onto the workpiece thereby binding said threaded bushing to said screw means.

4. The workpiece holddown device of claim 1, wherein said sleeve defines a clearance between said cylindrical post and an inner surface of said sleeve, said clearance being of a distance whereby said sleeve is slidable on said cylindrical post but frictionally binds against said cylindrical post when said sleeve is tilted.

5. The workpiece holddown device of claim 4, wherein said clearance is substantially 0.002 inches.

6. The workpiece holddown device of claim 1, wherein said screw means comprises:

- a threaded bushing;
- a screw portion threadedly received in said threaded bushing;
- a foot disposed on one end of said screw portion proximate the work surface; and
- a handle disposed on another end of said screw portion distal the work surface for tightening said screw means onto the workpiece, whereby the tightening produces an upward force against said threaded bushing creating said moment.

7. The workpiece holddown device of claim 1, wherein said cylindrical post includes on one end adjacent the work surface a threaded bore, said mounting means comprising a bolt extending through said opening in said work surface and threadedly received in said bore.

8. The workpiece holddown device of claim 7, wherein said sleeve defines a clearance between said post and an inner surface of said sleeve, said clearance being of a distance whereby said sleeve is slidable on and rotatable about said post but frictionally binds against said post when said sleeve is axially offset.

9. The workpiece holddown device of claim 7, wherein said bolt includes a T-nut, and said mounting means further comprises a collar radially surrounding said post at the work surface and having a bore therein through which said bolt extends.

10. The workpiece holddown device of claim 9, wherein said cylindrical post includes flats on another end thereof for receiving a tool in order to tighten said cylindrical post onto the work surface.

11. The workpiece holddown device of claim 1, wherein said arm assembly outwardly and upwardly extends from said cylindrical post at an angle upwardly defined from a perpendicular line defined from said longitudinal axis.

12. The workpiece holddown device of claim 11, wherein said angle is greater than 0°, but less than about 45°.

* * * * *